United States Patent [19]

Price

[11] Patent Number: 4,852,351
[45] Date of Patent: Aug. 1, 1989

[54] DUAL-CIRCUIT MASTER CYLINDER WITH SOLENOID OPENED RESERVOIR VALVE

[75] Inventor: Anthony G. Price, Cwmbran, Great Britain

[73] Assignee: Lucas Industries public limited company, Birmingham, England

[21] Appl. No.: 143,043

[22] Filed: Jan. 12, 1988

[30] Foreign Application Priority Data

Jan. 13, 1987 [GB] United Kingdom ................ 8700651

[51] Int. Cl.⁴ ........................ B60T 11/20; B60T 11/34
[52] U.S. Cl. .................................... 60/545; 60/547.1; 60/562; 60/585; 60/589; 60/591
[58] Field of Search ...................... 60/545, 547.1, 561, 60/562, 584–585, 589, 581, 591, 567, 550; 91/453

[56] References Cited

U.S. PATENT DOCUMENTS

| | | | |
|---|---|---|---|
| 3,253,409 | 5/1966 | Kellogg et al. | 60/547.1 X |
| 3,795,111 | 3/1974 | Haraikawa | 60/589 X |
| 3,799,300 | 3/1974 | Cochrane et al. | 60/547.1 X |
| 3,800,540 | 4/1974 | Papiau | 60/585 X |
| 4,072,012 | 2/1978 | Kawakami | 60/562 |
| 4,093,313 | 6/1978 | Burckhardt | 60/562 X |
| 4,338,787 | 7/1982 | Kawaguchi | 60/562 |
| 4,433,543 | 2/1984 | Thomas et al. | 60/547.1 |
| 4,475,336 | 10/1984 | Runkle | 60/547.1 X |
| 4,530,209 | 7/1985 | Steffes | 60/547.1 |
| 4,667,476 | 5/1987 | Takata et al. | 60/545 |
| 4,679,397 | 7/1987 | Kosarski et al. | 60/562 |
| 4,708,405 | 11/1987 | Belart et al. | 60/547.1 X |

Primary Examiner—Robert E. Garrett
Assistant Examiner—George Kapsalas
Attorney, Agent, or Firm—Fleit, Jacobson, Cohn, Price, Holman & Stern

[57] ABSTRACT

A tandem master cylinder has a housing containing two pressure chambers for connection to separate braking circuits. A pressure piston component forms pistons movable in the pressure chambers to supply fluid under pressure to the circuits. A balance piston has opposed surfaces subject to the pressures respectively in the chambers and is movable, in response to a pressure difference between the chambers, to reduce the pressure difference. Control valves operate in response to brake actuating movement of the piston component normally to isolate the chambers from a fluid supply reservoir, and a disabling device disables the respective control valves individually to prevent pressurization of one of the chambers when actuation of one brake only is required.

20 Claims, 2 Drawing Sheets

DUAL-CIRCUIT MASTER CYLINDER WITH SOLENOID OPENED RESERVOIR VALVE

BACKGROUND OF THE INVENTION

1. Field Of The Invention

This invention relates to a tandem master cylinder, primarily for a vehicle hydraulic braking system, having a housing containing two pressure chambers for connection, in use, to separate braking circuits, and pressure piston means movable in the housing under the influence of a single force input device in order to supply fluid under pressure from the chambers to the circuits.

2. Description Of The Prior Art

When such a master cylinder is to be used in a vehicle such as an agricultural tractor for example, in which wheels at opposite sides of the vehicle are required to be braked simultaneously for normal retardation, or individually for steering purposes, it is necessary to provide for pressure fluid transfer between the chambers during simultaneous operation of the brakes in order to compensate for unequal brake wear, and to interrupt the transfer when the brakes are operated individually. One form of conventional arrangement of this kind is described in the earlier British Pat. No. 2074272 in which a selector valve assembly is used in conjunction with a tandem master cylinder in order to provide the required normal retardation and steering assistance modes of operation. Although this operates satisfactorily, it is complicated and expensive to produce and requires considerable installation space. Moreover, it is not readily susceptible to the incorporation of power servo means which is often a requirement on modern vehicles.

BRIEF SUMMARY OF THE INVENTION

An object of the invention is to provide an improved tandem master cylinder of simplified construction which incorporates pressure means and in which power servo means may be incorporated in a simple and convenient manner.

According to the present invention, a tandem master cylinder comprises a housing containing two pressure chambers for connection, in use, to separate braking circuits, pressure piston means movable in the housing under the influence of a single force input device in order to supply fluid under pressure from the chambers to the circuits, a balance piston subject on respective opposed surfaces to the pressures in the chambers and being movable om response to a pressure difference between the chambers in such a manner as to reduce the pressure difference, control valves associated respectively with the chambers and normally operable in response to brake actuating movement of the piston means to isolate the pressure chambers from a low pressure region, and disabling means operable to disable the control valves individually so as to prevent pressurization of one or other of the chambers when actuation of one brake only is required.

Preferably, the balance piston is housed within the pressure piston means and conveniently urged towards a predetermined position by opposed forces derived, typically, from oppositely acting springs, one of which may conveniently be arranged to urge one of the control valves towards its closed position. Preferably, the disabling means are electrically operable.

In one convenient practical arrangement, valve means actuated by the force input device controls the application of fluid pressure from an inlet to the piston device in order to permit an assisting force to be applied to the piston device when the force input device is operated. Fluid pressure from the pressure inlet is preferably applied to one side of the pressure piston means remote from the chambers.

BRIEF DESCRIPTION OF THE DRAWINGS

The invention will now be described, by way of example, with reference to the accompanying drawings wherein.

DETAILED DESCRIPTION OF THE PREFERRED EMBODIMENTS

Figure 1:
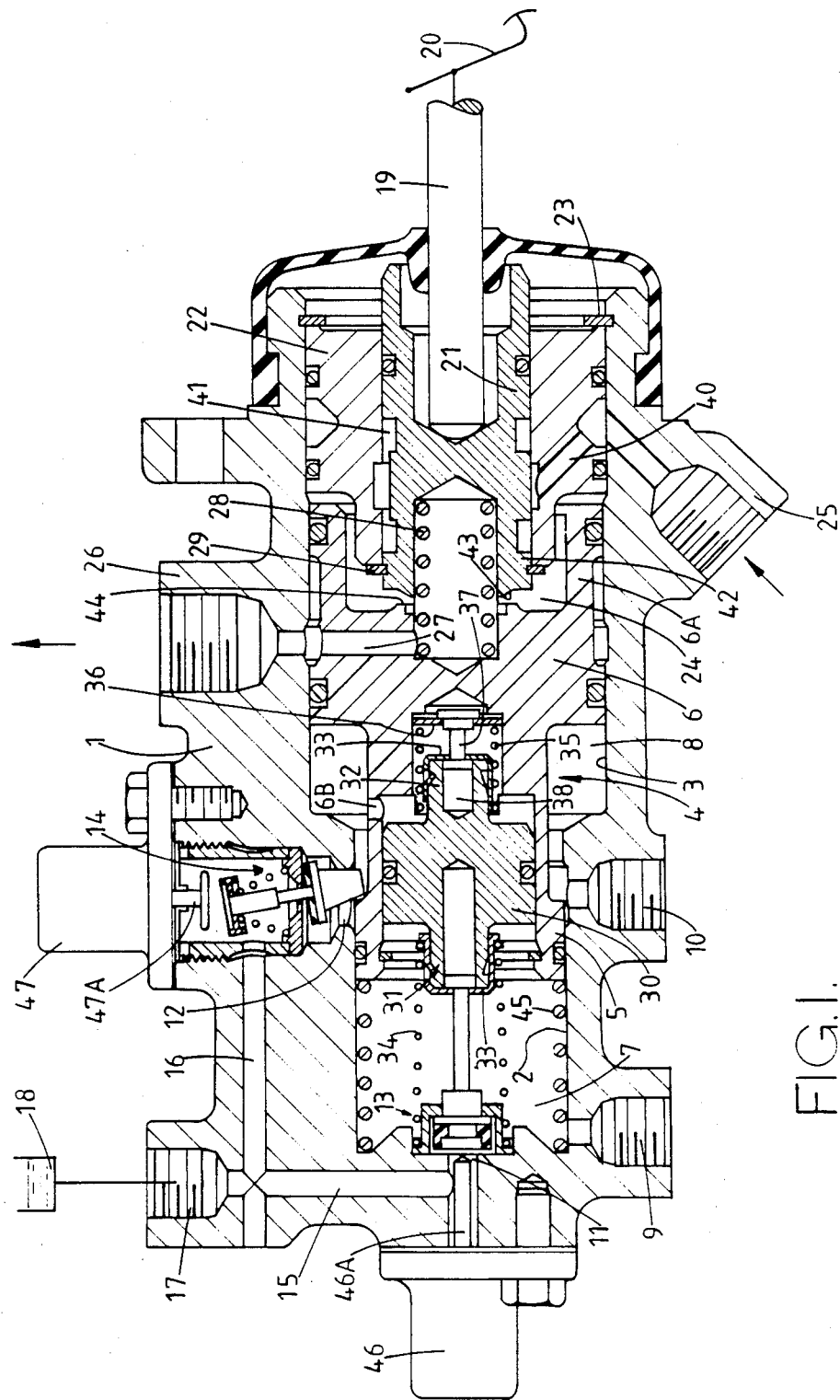
FIG. 1 is a longitudinal cross-sectional view through one form of tandom master cylinder of the invention.

The tandem master cylinder illustrated in FIG. 1 of the drawings comprises a housing 1 having an internal stepped bore forming a smaller diameter bore portion 2 and a larger diameter bore portion 3. The body contains a stepped piston, indicated generally at 4 forming smaller and larger diameter pistons 5 and 6 respectively in bore portions 2 and 3. The pistons 5 and 6 define, together with adjacent parts of the housing 1, respective pressure chambers 7 and 8 communicating with corresponding outlet ports 9, 10 which, in use, will usually be connected to brakes associated with wheels at either side of a tractor. Inlet ports 11, 12 of the chambers 7 and 8, respectively, are controlled respectively by a conventional center valve assembly 13 and a conventional tipping valve assembly 14, the operation of which valves will be familiar to those skilled in the art. The inlet ports 11, 12 are connected via passages 15, 16 to a main inlet port connection 17 of the body 1 intended for connection, in use, to a reservoir 18. The effective areas of the pistons would normally be such that fluid displacement from the chambers 7, 8 is substantially equal for a given piston displacement, although alternative arrangements can be envisaged in which unequal fluid displacement occur.

The piston 4 is actuated by an input rod 19 in response to movement of a driver-operated pedal 20. The rod 19 acts directly on a spool 21 slidable within an end member 22 disposed co-axially within an end portion of the larger diameter bore 3 and restrained axially in one direction by a circlip 23. A power chamber 24 is defined between the end member 22 and the adjacent hollow end part 6A of the larger diameter piston 6, the chamber 24 being supplied in the operative position with fluid under pressure via a pressure fluid inlet 25, to which fluid is supplied typically, from a pump, and communicating, in the inoperative condition of the master cylinder, as shown, with a low pressure tank via an outlet connection 26 and an associated passage 27. The spool 21 is urged to the right, as seen in the drawing, by a spring 28 housed partially within the spool 21 and reacting against the large diameter piston 6. Movement of the spool to the right is limited by abutment of a circlip 29 thereon against the end member 22.

The piston 5 is hollow and contains a balance piston 30 slidable therein. This piston has a pair of opposed bosses 31, 32 over each of which is fitted a cap 33 providing abutments for engagement by respective springs 34, 35 at opposite sides of the piston. The spring 34 controls the operation of the valve assembly 13 in conventional manner and also applies a rightward force to the balance piston 30 via the adjacent cap 33. The other spring 35 applies an opposing force to the balance piston by reaction against the piston 6 via a washer 36 cooperating with a stem 37 held slidably captive within a bore 38 of the balance piston by the corresponding cap 33. Opposite sides of the balance piston are subject respectively to the pressures in the chambers 7, 8, communication between the chamber 8 and the piston being via a hole 6B through a wall of the stepped piston.

Each of the control valves 13, 14 is provided with electrically operated disabling means which can be operated selectively to prevent one or other of these valves from closing, the effect of which is to prevent the corresponding chamber 7 or 8 from being pressurized in order to render the associated brake inoperative. The remaining operative brake then acts to provide steering assistance, facilitating a spin turn of the vehicle. The disabling means are in the form of electrical solenoids 46, 47, each having a respective push rod 46A, 47A which, upon actuation of the appropriate solenoid is brought to a position in which it prevents the adjacent valve 13, 14 from closing. In the arrangement illustrated, the solenoid 46 extends the rod 46A to a position in which the center valve 13 is positively prevented from reaching its closed position and the solenoid 47 urges the rod 47A into engagement with the open valve 14 so as positively to retain the valve in this position. By operating the solenoids selectively, either of the valves may be disabled, at will, permitting spin turns of the cylinder in either steering direction. Operation of the solenoids is conveniently controlled by an electronic controller which can be programmed to provide a number of functions. For example, as a safety measure, the controller may perform a timing function to ensure that the steering assist mode is established for a limited duration, following which the operative solenoid is deactivated to return the system to its normal braking condition. This arrangement avoids the possibility of the system being placed or left in the steering assist mode inadvertently, which could be dangerous when subsequent straight-line braking is required.

The master cylinder illustrated in FIG. 1 operates in the following manner to actuate both brakes for normal retardation of the cylinder. With the various components in their illustrated positions, pressure fluid entering the housing at the inlet 25 passes through a passage 40 in the end member 22 into a cavity 41 created by localized reduction in diameter of the spool 21, the pressure fluid being, at this stage, retained within the chamber 41 by a land 42 of the spool engaging the internal wall of the end member 22. Upon actuation of the pedal 20 causing inward movement of the rod 19, the spool moves to the left to a position in which a valve element 43 on the forward end of the spool engages a seat 44 of the piston to isolate the chamber 24 from the outlet passage 27 and simultaneously to transfer the actuating movement of the pedal to the piston 6. With the input rod 19 now acting directly on the piston 6 and with pressure established in the chamber 24 acting on the rear face of the piston 6, the pistons 5 and 6 move to the left under the combined effects of force applied to the pedal 20 and force derived from the pressure in chamber 24 acting on the piston 6. Initial leftward movement of the piston assembly 4 against the action of a piston return spring 45 enables the center valve 13 and tipping valve 14 to assume their closed positions, in conventional manner, thereby isolating the pressure chambers 7 and 8 from the reservoir 18, enabling pressurized fluid to be discharged from the pressure chambers 7 and 8 to the braking circuits via the outlets 9 and 10. In the event that unbalanced operation of the actuated brakes occurs, due, for example, to uneven rates of wear in the associated friction elements of the brakes, more fluid will be required from one of the chambers 7, 8 than the other. Under these conditions, the balance piston 30 will move in a direction away from the chamber experiencing the greater pressure and against the opposing spring 34 or 35 in order to permit pressure equalization to take place between the chambers.

In the embodiment of FIG. 1, the pistons 5 and 6 are of relatively large diameter, performing a relatively short stroke. Such an arrangement is particularly suitable for brakes requiring large volumes of operating fluid supplied at low pressures, as for example in annular piston brakes.

Figure 2:
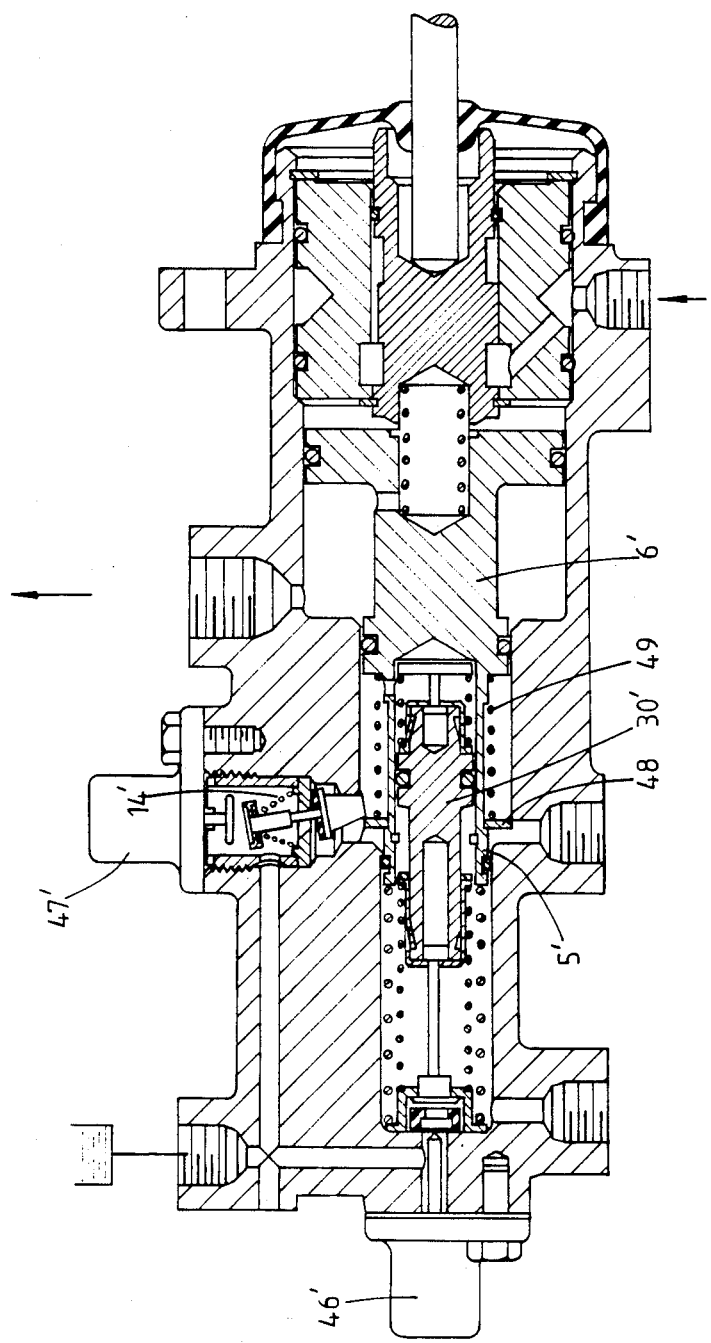
FIG. 2 is a view similar to FIG. 1 of an alternative embodiment of the master cylinder of the invention.

FIG. 2 illustrates a tandem master cylinder similar in principle and construction to that of FIG. 1, but designed for use with brakes requiring low volumes of actuating fluid supplied at relatively high pressure. For this purpose, the pistons 5' and 6' are of significantly smaller diameter and their working travel is considerably longer than in the embodiment of FIG. 1. Because of the relatively small diameter of the piston 5', it is necessary to extend it radially to enable it to actuate the tipping valve 14' and this is conveniently achieved by the provision of a split washer 48 of appropriate radial extent held against a shoulder of the piston by a spring 49 reacting against an end of the piston 6'. The master cylinder of FIG. 2 incorporates a balance piston 30' and a power actuation assembly for the stepped piston of the master cylinder, both operating as described in connection with FIG. 1. Solenoid disabling valves 46', 47' are also provided and operate in the manner described previously.

I claim:

1. A tandem master cylinder comprising:
 a housing;
 two pressure chambers in said housing;
 an outlet for each pressure chamber for connection in use to separate braking circuits;
 pressure piston means movable in said two pressure chambers;
 a force input device for moving said pressure piston means in said chambers for supplying fluid in said two pressure chambers under pressure through said outlets;
 a balance piston operatively associated with said pressure piston means and having opposed surfaces engaged respectively by fluid pressures in said two pressure chambers, said balance piston being movable in response to a pressure difference between said two pressure chambers for reducing said pressure difference;
 control valve means operatively associated respectively with said two pressure chambers for normally operating in response to said movement of said pressure piston means by said force input device to isolate said two pressure chambers from a low pressure region; and
 disabling means operatively associated with said control valve means for disabling said control valve means individually to prevent pressurization of one of said pressure chambers when actuation of only one brake is required.

2. A tandem master cylinder as claimed in claim 1 wherein:
said two pressure chambers each have ports communicating with said low pressure region; and
said control valve means are disposed in said housing between said two pressure chambers and said low pressure region.

3. A tandem master cylinder as claimed in claim 1 wherein:
said disabling means are electrically operated.

4. A tandem master cylinder as claimed in claim 1 wherein:
said balance piston is movably mounted within said pressure piston means.

5. A tandem master cylinder as claimed in claim 4 wherein:
said pressure piston means comprises a single integrated piston member having two piston parts.

6. A tandem master cylinder as claimed in claim 1 wherein:
said pressure piston means comprises a single integrated piston member having two piston parts.

7. A tandem master cylinder as claimed in claim 6 wherein:
said two pressure chambers each have ports communicating with said low pressure region; and
said control valve means are disposed in said housing between said two pressure chambers and said low pressure region.

8. A tandom master cylinder as claimed in claim 1 wherein:
said two pressure chambers have different diameters; and
said pressure piston means comprises piston portions having different diameters and movable in fluid tight relationship in respective chambers.

9. A tandem master cylinder as claimed in claim 8 wherein:
said two pressure chambers each have ports communicating with said low pressure region; and
said control valve means are disposed in said housing between said two pressure chambers and said low pressure region.

10. A tandem master cylinder as claimed in claim 8 wherein:
said piston portions are integrally formed parts of a unitary pressure piston member.

11. A tandem master cylinder as claimed in claim 1 and further comprising:
opposing force means for urging said balance piston toward a predetermined position.

12. A tandem master cylinder as claimed in claim 11 wherein:
said opposing force means comprises springs acting on said opposed surfaces of said balance piston.

13. A tandem master cylinder as claimed in claim 12 wherein:
one of said springs is disposed between said balance piston and one of said control valve means for urging said one control valve means toward an open position thereof.

14. A tandem master cylinder as claimed in claim 1 and further comprising:
a pressure fluid inlet in said housing; and
input device valve means operatively associated with said force input device for actuation thereby for controlling the application of fluid pressure from said pressure fluid inlet to said pressure piston means to provide an additional force for moving said pressure piston means when said force input device is operated.

15. A tandem master cylinder as claimed in claim 14 wherein:
said balance pistonis movably mounted within said pressure piston means.

16. A tandem master cylinder as claimed in claim 14 wherein:
a power pressure chamber is provided between said housing and said pressure piston means communicating with a low pressure region in the non-actuated position; and
said input device valve means comprises a spool valve having a peripheral land for controlling fluid flow between said pressure fluid inlet and said power pressure chamber, and a valve element for controlling communication between said power pressure chamber and said low pressure region.

17. A tandem master cylinder as claimed in claim 16 and further comprising:
an opening in said pressure piston means for connecting said power pressure chamber with said low pressure region; and
a valve seat on said pressure piston means surrounding said opening and engageable with said valve element so that when said force input device is actuated said input device valve means is closed and the force of said force input device is transmitted to said pressure piston means through said spool valve and said input device valve means.

18. A tandem master cylinder as claimed in claim 17 wherein:
said two pressure chambers each have ports communicating with said low pressure region; and
said control valve means are disposed in said housing between said two pressure chambers and said low pressure region.

19. A tandem master cylinder as claimed in claim 18 wherein:
said balance piston is movably mounted within said pressure piston means.

20. A tandem master cylinder as claimed in claim 19 wherein:
said two pressure chambers have different diameters; and
said pressure piston means comprises piston portions having different diameters and movable in fluid tight relationship in respective chambers.

* * * * *